(12) United States Patent
Friesen

(10) Patent No.: US 9,425,552 B2
(45) Date of Patent: Aug. 23, 2016

(54) LOCKING APPARATUS FOR PLUG CONNECTORS

(71) Applicant: HARTING ELECTRONICS GMBH, Espelkamp (DE)

(72) Inventor: Heinrich Friesen, Minden (DE)

(73) Assignee: HARTING ELECTRONICS GMBH (DE)

( * ) Notice: Subject to any disclaimer, the term of this patent is extended or adjusted under 35 U.S.C. 154(b) by 0 days.

(21) Appl. No.: 14/897,447

(22) PCT Filed: Jul. 10, 2014

(86) PCT No.: PCT/DE2014/100243
§ 371 (c)(1),
(2) Date: Dec. 10, 2015

(87) PCT Pub. No.: WO2015/007268
PCT Pub. Date: Jan. 22, 2015

(65) Prior Publication Data
US 2016/0126673 A1 May 5, 2016

(30) Foreign Application Priority Data

Jul. 18, 2013 (DE) .................... 20 2013 103 217 U

(51) Int. Cl.
*G02B 6/38* (2006.01)
*H01R 13/639* (2006.01)
(Continued)

(52) U.S. Cl.
CPC ............. *H01R 13/639* (2013.01); *F16L 37/08* (2013.01); *G02B 6/3893* (2013.01); *H01R 13/6275* (2013.01); *H01R 13/6277* (2013.01)

(58) Field of Classification Search
CPC .... H01R 13/639; F16L 37/08; G02B 6/3893
USPC .................. 385/53–56, 62; 285/403; 439/345
See application file for complete search history.

(56) References Cited

U.S. PATENT DOCUMENTS

| 3,574,359 A | * | 4/1971 | Klein | ..................... F16L 37/144 285/305 |
| 4,884,829 A | * | 12/1989 | Funk | ....................... B60R 16/08 285/24 |
| 7,708,320 B2 | * | 5/2010 | Binder | ................ F16L 37/0982 285/308 |

(Continued)

FOREIGN PATENT DOCUMENTS

EP          1898498          3/2008          ........... H01R 13/627

OTHER PUBLICATIONS

International Preliminary Report on Patentability issued in application No. PCT/DE2014/100243, dated Jan. 28, 2016 (9 pgs).

(Continued)

*Primary Examiner* — Ellen Kim
(74) *Attorney, Agent, or Firm* — Hayes Soloway P.C.

(57) ABSTRACT

Disclosed is a locking apparatus for plug connectors, comprising at least one first locking half and at least one second locking half, wherein the first locking half is formed from an inner sleeve and an outer sleeve, wherein the outer sleeve can be moved in a linear manner against a plugging direction towards the inner sleeve, and wherein the second locking half is formed from a further sleeve which can be inserted into the inner sleeve of the first locking half, and wherein the first locking half has at least one associated latch which acts on an inserted sleeve through at least one latching opening in the inner sleeve.

11 Claims, 4 Drawing Sheets

(51) Int. Cl.
    *H01R 13/627*     (2006.01)
    *F16L 37/08*     (2006.01)

(56) References Cited

U.S. PATENT DOCUMENTS 7,770,940 B2 * 8/2010 Binder ................. F16L 37/088
                                                 285/308
9,273,812 B2 * 3/2016 Bassaco ................. F16D 25/08

2007/0026703 A1   2/2007  Taga et al. ................... 439/108
2008/0064250 A1 *  3/2008  Lee ................... H01R 13/6277
                                                       439/352
2010/0330835 A1  12/2010  Rudolph et al. .............. 439/357

OTHER PUBLICATIONS

International Search Report issued in application No. PCT/DE2014/100243, dated Sep. 11, 2014 (4 pgs).

* cited by examiner

LOCKING APPARATUS FOR PLUG CONNECTORS

BACKGROUND OF THE INVENTION

The invention relates to a locking apparatus for plug connectors.

Locking apparatuses of this type are required in order to mechanically latch two plug connectors to one another. These may be electric, pneumatic, optical or hydraulic plug connectors. Any type of plug connector must ensure that the produced connection is mechanically secured against an undesired separation of the connection.

For this purpose, a large number of locking apparatuses are known from the prior art that ensure a mechanical releasable connection of two plug connectors.

A type of locking apparatus used readily in the prior art is constituted by what is known as "push-pull" locking and unlocking. These locking apparatuses are characterized by their simple handling. The plug connection is locked by simply pushing (push) and is unlocked by simply pulling (pull).

Push-pull plug connectors of this type usually have an actuation means, which surrounds the plug connector in a sleeve-like manner. A housing of the plug connector is thus likewise formed, such as an actuation means in order to actuate the locking and unlocking.

In the case of plug connectors of this type having push-pull mechanisms, it is disadvantageous that these are each developed for a special embodiment and are only compatible therewith. The production is therefore usually very complex on account of the many individual parts from which such a plug connector is produced.

This high production effort and the number of individual parts here usually have a negative effect on the production costs of plug connectors of this type.

SUMMARY OF THE INVENTION

The problem addressed by the invention therefore lies in presenting a push-pull plug connector which can be produced easily, from few individual parts and therefore economically.

The invention relates to a locking apparatus for plug connectors. Here, the locking apparatus is formed from a first locking half and a second locking half. The two locking halves are expediently each provided on a plug convector and can be joined together and locked with one another.

A secure, mechanical contacting of the two plug connectors to be connected is ensured by the locking of the two locking halves.

The first locking half consists of an outer sleeve and an inner sleeve. The preferably round sleeves are linearly displaceable relative to one another in the plug-in direction. The outer sleeve may preferably be displaced against the plug-in direction on the inner sleeve over a short range from approximately 1 to 10 mm.

The second locking half is formed from a further sleeve. The further sleeve of the second locking half corresponds expediently to be same form as the two sleeves of the first locking half and in terms of its dimensioning is smaller than the inner sleeve. The further sleeve may thus be slid into the inner sleeve of the first locking half in order to contact the locking apparatus.

In order to ensure not only a contacting, but also a latching of the locking halves with one another, the first looking half also has at least one detent means, which acts on the further sleeve of the second locking half.

The detent means is expediently produced from a resilient material, for example metal or plastic, and is arranged between the outer and the inner sleeve. A detent opening in the inner sleeve makes it possible for the detent means to act at least in regions on the further sleeve and thus enables a locking between the first locking half and the second locking half.

The resilient detent means is a substantially U-shaped element. It is formed from two limbs and a base, wherein the limbs are each connected to the base via a bent region. It is particularly advantageous to form the detent means from a wire. The locking force of the locking apparatus thus can be adjusted depending on the strength and material properties of the wire.

The detent means is advantageously arranged between the inner and the outer sleeve such that the limbs extend approximately parallel to the plug-in direction and the base of the detent means is oriented approximately transversely to the plug-in direction. The base of the detent means can thus act on the further sleeve through the detent opening in the inner sleeve.

Here, it is expedient to introduce the detent opening as a slot into the inner sleeve. Due to an orientation of the detent opening likewise directed approximately transversely to the plug-in direction, it is possible to guide through the base of the detent means.

In order to ensure a secure latching between the detent means and the further sleeve of the second locking half, a detent recess is provided in the further sleeve, with which recess the detent means can engage.

The detent recess is also preferably likewise formed as a slot or groove. A useful orientation of this relative to the plug-in direction such that the base of the detent means can latch into said recess is advantageous. Here, the recess may be merely a short groove or a slot.

However, an embodiment in which the slot or the groove extends over the entire circumference of the further sleeve is also conceivable. In the case of such a circumferential detent recess, the orientation of the two locking halves relative to one another is particularly advantageously irrelevant to the plug-in process.

In a particular embodiment the detent means is matched to the form of the inner sleeve. This especially means that primarily the base of the detent means is matched to the form of the inner sleeve so as to be arranged between the inner and the outer sleeve in the most space-saving manner possible.

By way of example, it would thus be conceivable in the case of a round inner sleeve to provide the base of the detent means likewise with a curve or a number of bends.

Depending on the embodiment, various possibilities for fixing the detent means are conceivable. In one embodiment the free limbs of the detent means are fastened to the inner sleeve. For this purpose, these limbs can be inserted easily into holes provided in the inner sleeve.

In accordance with a further expedient embodiment, the limbs of two provided detent means are to be connected to one another. The first of the limbs can thus be connected in each case to a second limb. A one-piece embodiment of a number of detent means can thus be provided. These interconnected detent means are placed around the inner sleeve, are held together mutually, and therefore do not have to be fixed further to the inner sleeve.

In order to enable an unlocking of the two locking halves, the outer sleeve has at least one, preferably two pairs of wedge surfaces. These are arranged on the inner side of the outer sleeve such that, as the outer sleeve is displaced relative to the inner sleeve, the wedge surfaces act on the one or more detent means. In so doing, the detent means are deformed flexibly, such that the base of the detent means is released from the engagement of the further sleeve. A release of the connection between the two locking halves is thus possible.

In a further advantageous embodiment the wedge surfaces are arranged in pairs and act between two detent means on the curved regions thereof between limbs and base. Due to a particular embodiment of the curved regions of the detent means, a particularly advantageous, mechanical interaction between wedge surfaces and detent means can be produced.

For this purpose, a type of "ear" is produced on the one hand in the curved region of the detent means, such that the detent means are wider in the curved region than in the region of the free limb ends.

On the other hand, a particular orientation of the wedge surfaces is advantageous. For this purpose, the wedge surfaces should form an angle between 0 and 90 degrees to the plug-in direction. An angle between 20 and 60 degrees, in particular between 30 and 50 degrees to the plug-in direction is particularly advantageous.

BRIEF DESCRIPTION OF THE DRAWINGS

An exemplary embodiment of the invention is illustrated in the drawings and will be explained in greater detail hereinafter. In the drawings.

DETAILED DESCRIPTION OF THE INVENTION

Figure 1:
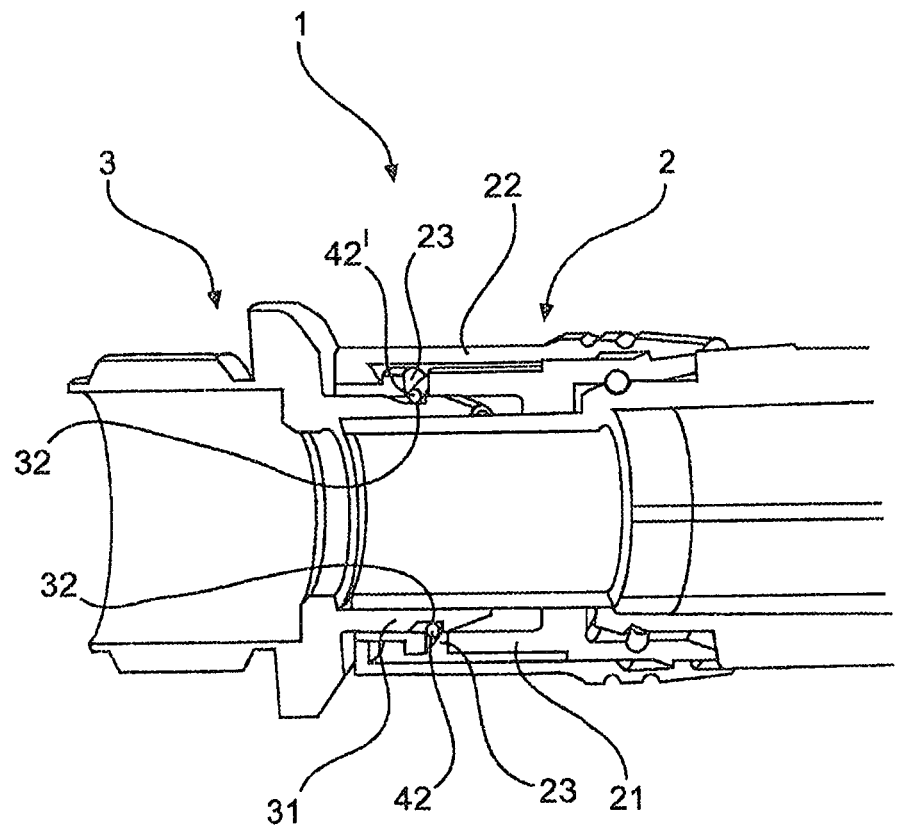
FIG. 1 shows a sectional illustration of a locking apparatus.

FIG. 1 shows a locking apparatus 1 consisting of a first locking half 2 and a second locking sleeve 3. The second locking half 3 is formed, beside a connection region for a plug connector illustrated on the left, from a sleeve 31 inserted into the first locking half 2.

The sleeve 31 has, on its plug-in side, a chamfer, in order to facilitate an insertion into the first locking half 2. Adjacently thereto, a detent recess 32 is provided circumferentially on the sleeve 31 and is suitable for latching detent means 4 therein.

The first locking half 2 consists substantially of two sleeves inserted one inside the other: an inner sleeve 21 and an outer sleeve 22, wherein the outer sleeve 22 is arranged on the inner sleeve 21 axially displaceably against the plug-in direction S.

It can also be seen in FIG. 1 that the first locking half 2 is arranged on a plug connector by means of a snap ring.

In order to lock the first locking half 2 to the second locking half 3, a detent means 4 is provided. Of the detent means 4, merely the cross section of the base 42 can be seen in this illustration. The detent means 4 engages with this base 42 through a detent opening 23 of the inner sleeve 21 and can thus engage with the detent recess 32 of the further sleeve 31 of the second locking half 3.

In order to release the locking of the first and second locking half 2, 3, merely the base 42 of the detent means 4 must be lifted from the detent recess 32.

In the illustrated exemplary embodiment, the locking apparatus 1 has two detent means 4, 4'. The base 42 of the first detent means 4 is therefore provided in the lower region of the locking apparatus 1, and the base 42' of the second detent means is provided in the upper region.

Figure 2:
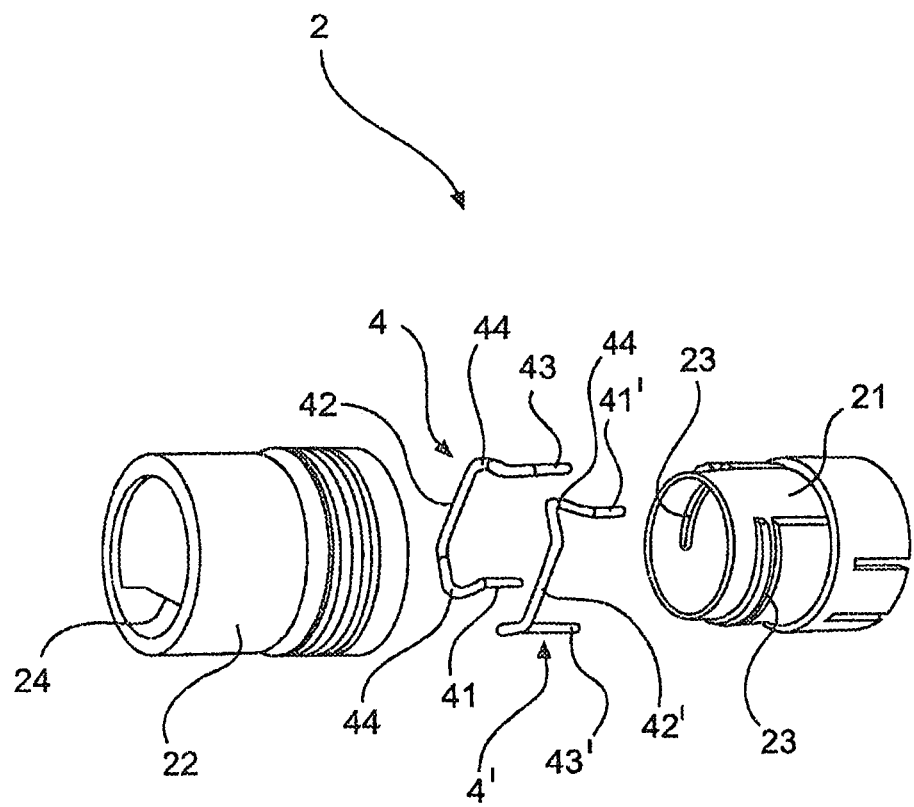
FIG. 2 shows an exploded view of a first locking half.

A first locking half 2 is illustrated in an exploded view in FIG. 2. The first locking half 2 consists of an inner sleeve 21 (illustrated here on the right) and an outer sleeve 22 (illustrated here on the left).

The inner sleeve 21 for this purpose is provided to be mounted on a plug connector. This can be provided both by means of a snap ring (as also already illustrated in FIG. 1) and by other possibilities, for example by means of a screw, gluing, riveting or press-fitting. A variant formed in one piece with a plug connector housing is also conceivable.

Two detent means 4, 4' are illustrated in the middle region of FIG. 2. These are provided in this exemplary embodiment for fastening on the inner sleeve 21. For this purpose, free limbs 41, 41', 43, 43' are inserted into and fixed in holes in the inner sleeve 21.

The limbs 41, 41', 43, 43' of the detent means 4, 4' are connected by the base 42, 42'. These are provided in order to be inserted into the detent opening 23 of the inner sleeve 21. It is thus possible for the base 42, 42' of the detent means 4, 4' to act on an inserted, second locking half 3 inside the inner sleeve 21.

The outer sleeve 22 illustrated in the left region surrounds the inner sleeve 21 and the detent means 4, 4'. The outer sleeve 22 here is axially displaceable on the inner sleeve 21 in and against the plug-in direction S. Here, wedge surfaces 24, which are arranged on the inner side of the outer sleeve 22, can act on the detent means 4, 4' and release the locking between first locking half 2 and second locking half 3.

Figures 4A, 4B:
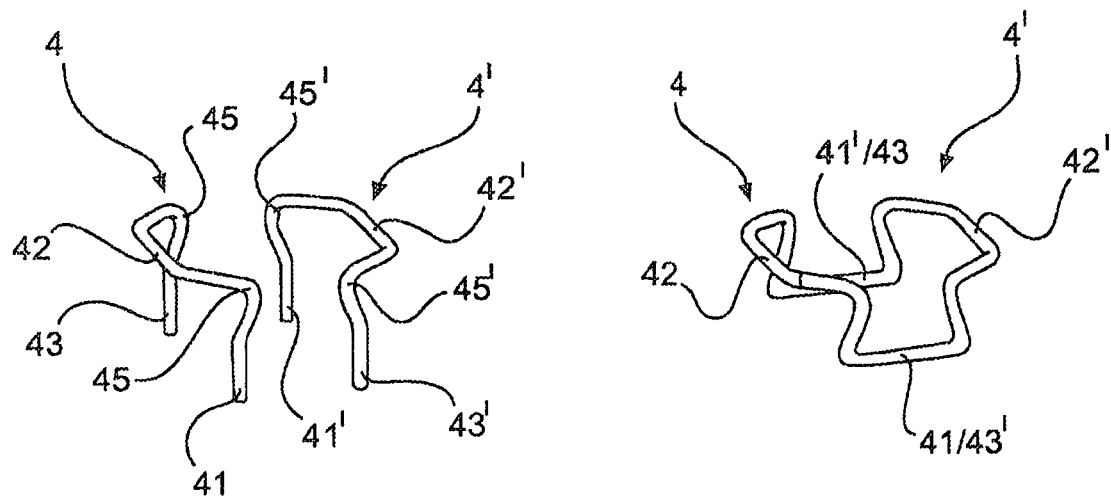
FIG. 4 shows two detent means.

The detent means 4, 4' in FIG. 2 are illustrated in greater detail in FIG. 4a. The detent means 4 are each formed from two limbs 41, 43, wherein the limbs 41, 43 are connected via a base 42. Here, the limbs 41, 43 are oriented approximately in parallel and the base 42 is oriented approximately transversely thereto, thus giving a U-shape.

In the illustrated embodiment the base 42 of the detent means 4 is bent symmetrically at two positions in order to enable a better adaptation to the round inner sleeve 21.

The transition between limbs 41, 43 and base 42 is formed in each case by a bent region 44. In the special, illustrated embodiment, the bent regions 44 are wider than the arrangement of the limbs 41, 43 relative to one another. The detent means in this embodiment form a sweeping curve 45 in the region of the wider, bent regions 44.

The sweeping curves 45 are provided for an advantageous unlocking. For this purpose, the detent means 4 at the curves 45 can be better actuated by the wedge surfaces 24 of the outer sleeve 22. The exact operating principle will be described in greater detail in FIG. 5.

A special embodiment of the detent means 4, 4' is illustrated in FIG. 4b. In this, the detent means 4, 4' are not fastened to the inner sleeve 21, but two detent means 4, 4' are formed in one piece with one another. For this purpose, a limb 41, 41' is in each case connected to a limb 43, 43' of the other detent means 4, 4'.

The detent means 4, 4' thus formed can be placed around the inner sleeve 21 and requires no further fixing to the inner sleeve 21. The occurring spring forces of the detent means 4, 4' are compensated via the detent means 4, 4' arranged opposite.

Figure 3:
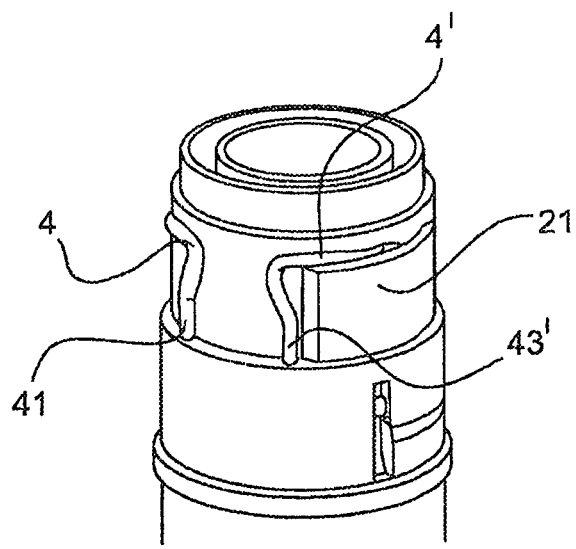
FIG. 3 shows an inner sleeve having detent means.

FIG. 3 shows an inner sleeve 21 having two detent means 4, 4' fastened thereto. The inner sleeve 21 is fastened on a schematically illustrated plug connector.

The limbs 41, 43'—as well as the limbs 41', 43 not visible—are inserted into and fixed in holes provided in the inner sleeve 21. The limbs 41, 41', 43, 43' are roughly axially oriented and can be deflected in a flexible manner. The bases 42, 42' of the detent means 4, 4' are inserted into the detent openings 23 and reach as far as the inner side of the inner sleeve 21. The detent means 4, 4' can thus engage by means of their base 42, 42' with a second locking half 3 to be inserted.

Figure 5:
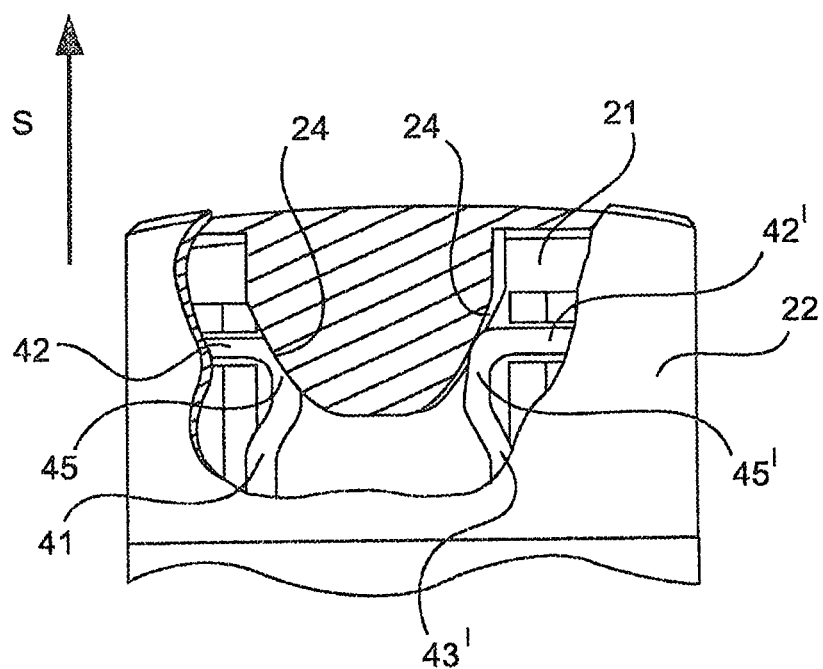
FIG. 5 shows a partial section of a first locking half.

The operating principle of the first locking half 2 can be seen in greater detail in a partial section in FIG. 5. What is shown is the cut-open outer sleeve 22 of the first locking half 2. Two detent means 4, 4' are arranged between the inner sleeve 21 and the outer sleeve 22.

Two wedge surfaces 24 are provided on the inner side of the outer sleeve 22. The wedge surfaces 24 are each associated with one of the sweeping curves 45, 45' of the detent means. By displacing the outer sleeve 22 against the plug-in direction S, the detent means 4, 4' are moved radially outwardly by the wedge surfaces 24. The advantageous shaping of the sweeping curves 45, 45' assists this movement.

Due to the spring force of the detent means 4, 4', the outer sleeve 22 is moved back again automatically in the plug-in direction S after actuation. For this purpose, it is particularly advantageous to produce the detent means 4, 4' from a material having good spring effect. Here, a corresponding plastic or metal would be expedient.

For simple contacting and locking of the two locking halves 2, 3, a bevel is formed integrally on the further sleeve 31 in the front region over the circumference. The base 42, 42' of the detent means 4, 4' can be raised via this bevel serving as a ramp until said detent means lock into the detent recesses 32.

The invention claimed is:

1. A locking apparatus for plug connectors, said plug connectors comprising
    at least one first locking half and at least one second locking half,
    wherein the first locking half is formed from an inner sleeve and an outer sleeve,
    wherein the second locking half is formed from a further sleeve, which can be inserted into the inner sleeve of the first locking half, and
    wherein the first locking half is associated with at least one detent, which acts on an inserted sleeve through at least one detent opening in the inner sleeve
    wherein the outer sleeve is linearly displaceable relative to the inner sleeve against a plug-in direction (S), and has wedge surfaces formed integrally on the inner side, wherein the wedge surfaces each are associated with one of the detents, and are arranged at an angle to the plug-in direction (S), selected from an angle of between 0 and 90 degrees to the plug-in direction (S), an angle between 20 and 60 degrees to the plug-in direction (S), and an angle between 30 and 50 degrees to the plug-in direction (S),
    wherein the detent substantially has a U-shape, which is formed from a first limb, a base and a second limb, wherein the first limb and the second limb are each connected to the base via a bent region,
    wherein the first limbs of at least two detents are each connected to a respective one of the second limbs of another detent, and
    wherein the first limbs of the at least two detents are each connected in one piece to a respective one of the second limbs of another detent, and the at least two detents are thus formed in one piece.

2. The locking apparatus as claimed in claim 1, wherein the base of the detent engages with a detent recess in the sleeve.

3. The locking apparatus as claimed in claim 2, wherein the detent recess and the base are oriented transversely to the plug-in direction (S).

4. The locking apparatus as claimed in claim 1, wherein the first limb and the second limb are oriented roughly axially to the plug-in direction (S).

5. The locking apparatus as claimed in claim 1, wherein the detent is adapted to the form of the inner sleeve.

6. The locking apparatus as claimed in claim 1, wherein the first limb and the second limb are fixed to the inner sleeve.

7. The locking apparatus as claimed in claim 1, wherein the detent is formed from a resilient wire.

8. The locking apparatus as claimed in claim 1, wherein the wedge surfaces are oriented radially to the plug connector center axis.

9. The locking apparatus as claimed in claim 1, wherein the bent regions of the detent are each associated with a wedge surface.

10. The locking apparatus as claimed in claim 1, wherein the first limb and the second limb of the detent extend away from one another in the bent regions, such that the detents are wider in the bent regions than at the ends of the limbs and in each case form a sweeping curve.

11. The locking apparatus as claimed in claim 10, wherein the bent region of the detent are each associated with a wedge surface,
    wherein the sweeping curves of the detent are each assigned a wedge surface formed integrally as an inner circle of the outer sleeve, in that, by displacing the outer sleeve against the plug-in direction (S), the wedge surfaces act on the sweeping curves of the detent, whereby the base of the detent is raised from the detent recess and releases the further sleeve.

* * * * *